(12) United States Patent
Sakurai et al.

(10) Patent No.: US 7,548,352 B2
(45) Date of Patent: Jun. 16, 2009

(54) ILLUMINATION DEVICE, DOCUMENT READING DEVICE, ADJUSTING DEVICE, AND IMAGE FORMING APPARATUS

(75) Inventors: Yasuo Sakurai, Kanagawa (JP); Masashi Kohchi, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 1044 days.

(21) Appl. No.: 10/820,734

(22) Filed: Apr. 9, 2004

(65) Prior Publication Data
US 2005/0135840 A1 Jun. 23, 2005

(30) Foreign Application Priority Data
Apr. 11, 2003 (JP) ............................. 2003-107979
May 19, 2003 (JP) ............................. 2003-140927

(51) Int. Cl.
*G03G 15/04* (2006.01)
(52) U.S. Cl. ...................... 358/475; 358/484; 358/509; 250/552; 355/67; 399/220
(58) Field of Classification Search ................. 358/475, 358/474, 484, 509, 482, 483, 512–514; 250/208.1, 250/205, 552, 578.1, 234, 235; 355/67–68; 399/220–221; 362/551–582, 800
See application file for complete search history.

(56) References Cited

U.S. PATENT DOCUMENTS

| | | | | |
|---|---|---|---|---|
| 4,541,015 | A * | 9/1985 | Itoh et al. ................. | 358/482 |
| 4,559,564 | A * | 12/1985 | Itoh et al. ................. | 358/482 |
| 4,638,987 | A | 1/1987 | Sakurai | |
| 4,715,597 | A | 12/1987 | Sakurai | |
| 5,331,146 | A * | 7/1994 | Tanimizu ................. | 250/208.1 |
| 5,581,076 | A * | 12/1996 | Tabata ..................... | 250/208.1 |
| 5,696,607 | A * | 12/1997 | Yamana et al. .............. | 358/474 |
| 5,715,500 | A | 2/1998 | Nakazato et al. | |
| 6,034,792 | A | 3/2000 | Nakazato et al. | |
| 6,320,681 | B1 * | 11/2001 | Yushiya ..................... | 358/509 |
| 6,563,609 | B1 * | 5/2003 | Hattori ..................... | 358/475 |
| 6,661,545 | B2 * | 12/2003 | Sato et al. ................. | 358/509 |
| 6,731,896 | B2 | 5/2004 | Kohchi | |
| 7,173,742 | B2 * | 2/2007 | Fang et al. ................. | 358/475 |

(Continued)

FOREIGN PATENT DOCUMENTS

JP 56-46261 4/1981

(Continued)

OTHER PUBLICATIONS

U.S. Appl. No. 10/162,615, filed Jun. 6, 2002, Kohchi et al.

*Primary Examiner*—Houshang Safaipour
(74) *Attorney, Agent, or Firm*—Oblon, Spivak, McClelland, Maier & Neustadt, P.C.

(57) ABSTRACT

An illumination device for a reading device which irradiates light over a predetermined illumination width including a reading area having a predetermined reading width extending in a main scanning direction of a document and reads the light reflected from the document using a reading element has a point light source, and a light-guiding member having an incident surface opposed to a light-emitting surface of the point light source and a light-emitting surface opposed to the reading area. An illumination area generated by the light has a high distribution range of a substantially constant illuminance, and the high distribution range coincides substantially with the reading area.

20 Claims, 14 Drawing Sheets

U.S. PATENT DOCUMENTS

| | | | |
|---|---|---|---|
| 7,274,495 B2 * | 9/2007 | Tseng | 358/484 |
| 7,333,249 B2 * | 2/2008 | Sawada | 358/484 |

FOREIGN PATENT DOCUMENTS

| | | |
|---|---|---|
| JP | 56-164362 | 12/1981 |
| JP | 61-163313 | 7/1986 |
| JP | 62-002772 | 1/1987 |
| JP | 63-063273 | 3/1988 |
| JP | 63-173455 | 7/1988 |
| JP | 2-280564 | 11/1990 |
| JP | 3-121653 | 5/1991 |
| JP | 3-58641 | 6/1991 |
| JP | 5-103157 | 4/1993 |
| JP | 5-46169 | 6/1993 |
| JP | 07-327112 | 12/1995 |
| JP | 08-172512 | 7/1996 |
| JP | 9-51402 | 2/1997 |
| JP | 9-83734 | 3/1997 |
| JP | 09-107440 | 4/1997 |
| JP | 9-266516 | 10/1997 |
| JP | 11-4022 | 1/1999 |
| JP | 2000-125080 | 4/2000 |
| JP | 2000-299765 | 10/2000 |
| JP | 2001-222076 | 8/2001 |
| JP | 2001-285577 | 10/2001 |
| JP | 2002-125098 | 4/2002 |

* cited by examiner

--Related Art--  FIG.20A
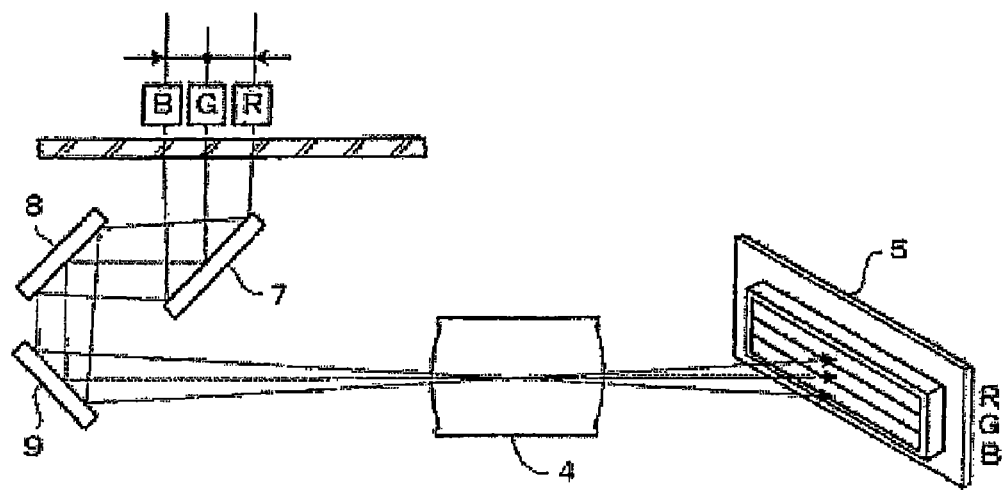
FIG.20B
--Related Art--
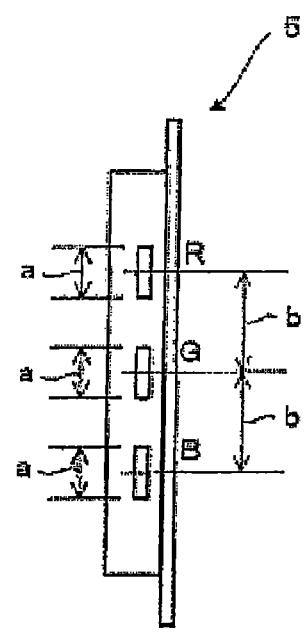

--Related Art--    FIG.21
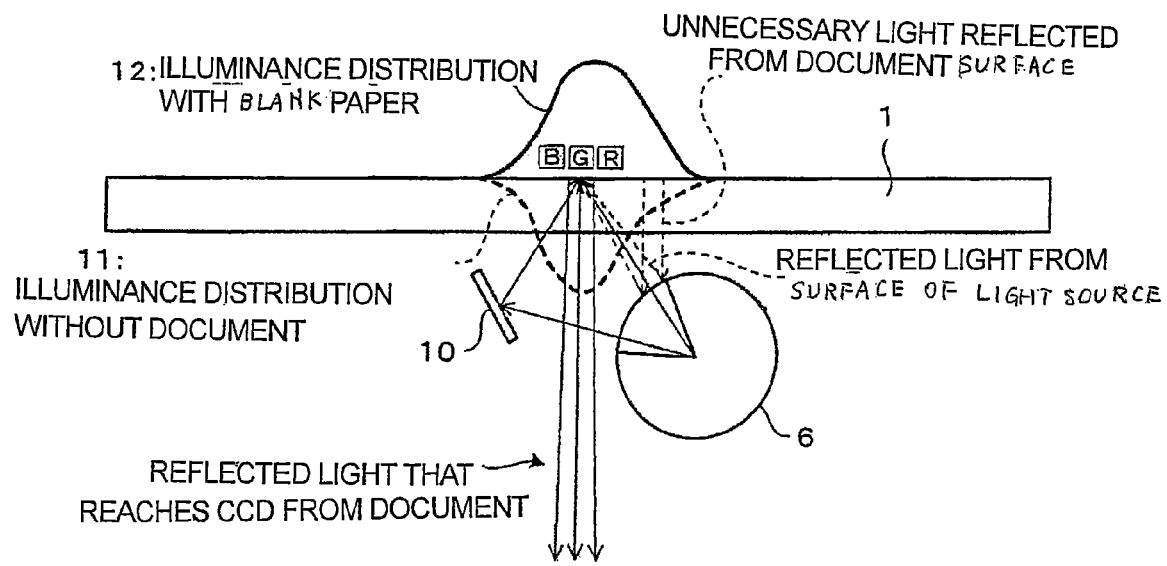
--Related Art--    FIG.22
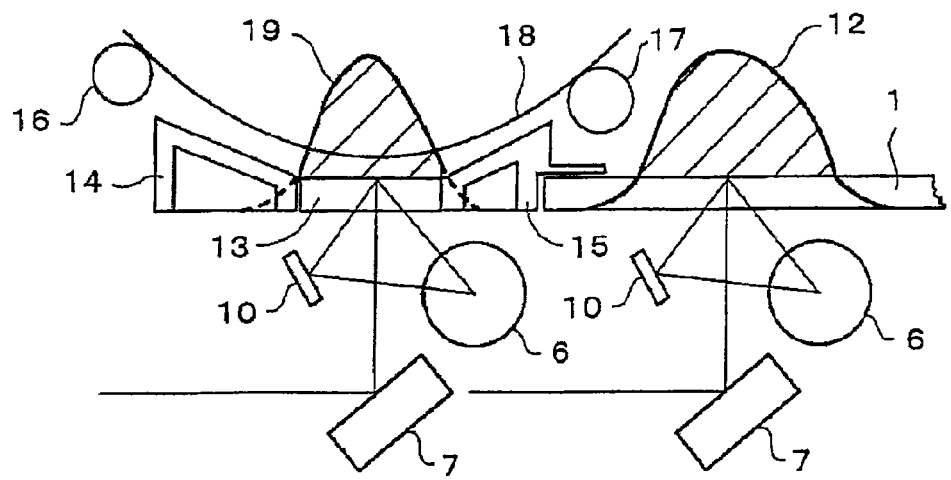

ILLUMINATION DEVICE, DOCUMENT READING DEVICE, ADJUSTING DEVICE, AND IMAGE FORMING APPARATUS

CROSS-REFERENCE TO RELATED APPLICATIONS

The present document incorporates by reference the entire contents of Japanese priority documents, 2003-107979 filed in Japan on Apr. 11, 2003 and 2003-140927 filed in Japan on May 19, 2003.

BACKGROUND OF THE INVENTION

1) Field of the Invention

The present invention relates to a technology of providing a light source for use in a reading device such as a digital copying machine or a general purpose scanner.

2) Description of the Related Art

FIG. 18 is a drawing that depicts one example of an image forming apparatus having a document reading device.

In this figure, reference numeral 21 is a photosensitive drum, 22 is a charging device, 23 is a cleaning device, 24 is a developing device, 25 is a transferring device, 26 is a fixing roller, 27 is a pressure roller, 28 is a fixing belt, 29 is a tension roller, 30 is a paper-feeding tray, 31 is a paper-feeding roller, 32 is a transporting roller, 33 is a resist roller, 34 is a paper-discharging roller, 35 is a paper-discharge tray, 90 is an exposing device and 100 is a reading device.

The photosensitive drum 21 is charged on its surface by the charging device 22, while rotating in the sub-scanning direction. The photosensitive member 21 is subjected to a scanning process in the main scanning direction that is perpendicular to the paper face with light L bearing image information that is released from the exposing device 90 to be exposed so that an electrostatic latent image is formed thereon. This electrostatic latent image is visualized by toner from the developing device 24 so that a toner image is formed.

A sheet of copy paper P, located at the uppermost position of the paper-feeding tray 30, is sent toward the paper-feeding roller 32 by the paper-feeding roller 31, and made in contact with the resist roller 33 to be stopped. In synchronized timing with the formation of the toner image on the photosensitive member, the copy paper is sent from the resist roller, and the toner image is transferred thereon by the transferring device 25 so that the toner image is fixed between the fixing roller 26 and the pressure roller 27, and the resulting copy paper is discharged onto the paper-discharge tray 35 by the paper-discharging roller 34, etc.

FIG. 19 is a schematic block diagram that depicts the reading device.

In this figure, reference numeral 1 is a contact glass plate that forms a document platen, 2 is a first carriage, 3 is a second carriage, 4 is an image forming lens, 5 is a CCD that serves as an image reading element, 6 is a light source, 7 is a first mirror, 8 is a second mirror and 9 is a third mirror.

A document, not shown, is put on the contact glass plate 1, with its document surface facing down, and a light source is turned on, and the first carriage 2 is shifted in the direction of arrow A at a predetermined speed. In this case, the second carriage 3 is shifted in the direction of arrow B at half the speed of the first carriage 2. The image forming lens 4 is placed with such a positional relationship that the image on the document surface is converged and formed as an image on the CCD 5 through the first to third mirrors 7, 8 and 9.

Even during the carriage shift, the surface of the contact glass plate 1 (document face) and the CCD 5 are allowed to always maintain their conjugate relationship with respect to image forming lens 4 so that a clear image is always taken by the CCD 5.

FIG. 20 is a drawing that depicts the conjugate relationship between the document surface and the CCD 5.

In this figure, codes R, G, B on the CCD represent reading-use CCD lines used for respective three primary colors (red, green, blue), and codes R, G, B on the document surface represent reading positions corresponding to the respective CCD lines, respectively.

Supposing that the reading width of the CCD is represented by a and that the gap of the respective lines of the CCD is b, the illumination light requires at least a width of 2b+a in the sub-scanning direction, when converted as the position of CCD. Supposing that the image forming magnification by the image forming lens is represented by m (m<1), the illumination width C on the document surface needs to satisfy at least the following equation: C=(2b+a)/m. When production errors and the like are taken into consideration, this value is preferably set to a slightly greater value; however, when the value becomes too great, the quantity of light that is not utilized effectively becomes greater, resulting in degradation in lighting efficiency.

FIG. 21 is a drawing that depicts an illuminance distribution in the sub-scanning direction on the document face, which is formed by a conventional light source.

In this figure, reference numeral 10 is an opposing mirror, 11 represents a distribution curve of direct light derived from a light source and the opposing mirror when there is no document, and 12 represents a illuminance distribution curve on an actual document face including secondary reflection and the like when white paper is placed.

Conventionally, a discharge tube such as a fluorescent lamp and a xenon lamp has been used as a light source, and this case has a structure as shown in this figure.

The illuminance distribution curve 11 is distributed virtually symmetrically with respect to the range C; however, the illuminance distribution curve 12 has a distribution that is biased slightly to the right. The reason for this is presumably because the illumination range of the light source 6 is wide so that light is also made incident on the document face other than the above-mentioned range C, with the result that light reflected from the document face hits the tube wall of the light source 6 to be again reflected to illuminate the document at a portion right above the light source.

The illuminance distribution curve 12 of this type causes not only a problem of loss of quantity of light, but also another problem when a compatible-type scanner of the fixed document type and the document-shifting type is used.

FIG. 22 is a drawing that depicts the illuminance distribution of the compatible-type scanner.

In this figure, reference numeral 13 represents ADF-use contact glass, 14 and 15 are opaque guide members, 16 and 17 are document feeding rollers, 18 is a sheet-shaped document, and 19 represents an illuminance distribution curve on the ADF side.

As shown in FIG. 19, upon reading the fixed document, the first and the second carriages are shifted. In contrast, upon reading the shifting document, the sheet-shaped document 18 is sent to the surface of the ADF-use contact glass 13 by the document feeding rollers 16 and 17 so that the image, illuminated by the light source 6 and the opposing mirror 10, is read by the CCD 5 through an image forming optical system including the first mirror 7 and the like.

This figure depicts the illuminance distribution curve at the position for use in the shifting document and the illuminance distribution curve at the position for use in the fixed document in a combined manner.

The illuminance distribution curve 12 at the position for use in the fixed document is the same as the distribution shown in FIG. 21. In contrast, with respect to the illuminance distribution curve 19 at the position for use in the shifting document, since the portion right above the light source 6 is virtually covered with the guide member 15 that is an opaque member, there is no reflection from the corresponding area and consequently, there is no unnecessary re-reflection. For this reason, there is virtually no illuminance distribution in an area outside the ADF contact glass 13; therefore, the illuminance distribution curve 19 forms a shape very close to the illuminance distribution curve 11 derived from direct light, shown in FIG. 21.

The difference in these illuminance distribution curves cause no problems when individually used; however, when a compatible-type scanner is formed by using the same CCD, two problems are newly raised.

One of the problems is that the quantity of illumination light differs depending on document faces, with the balance of quantities of light being different depending on colors. In comparison with the illuminance distribution curve 19 that has virtually a symmetrical shape with respect to the illumination range C, the illuminance distribution curve 12 has a great quantity of light as a whole with the peak value being biased to the light. Therefore, when the same CCD is used for receiving light while changing the reading systems, the sensitivity to the quantity of light and the sensitivity balance with respect to colors need to be changed. The sensitivity to the quantity of light can be electrically, controlled by using the AGC; however, the change in the sensitivity balance with respect to different colors needs to be taken into consideration in a separate manner.

Another problem is raised when, in the case of the fixed document, the document has a great difference in light and dark portions in the sub-scanning direction of the document. In other words, the reason that the peak value of the illuminance distribution curve 12 is biased to the right is because the reflected light from the document face is again reflected by the light source tube wall. Therefore, while the light portion of the document is located right above the tube wall, the illuminance distribution curve 12 as shown in FIG. 22 is obtained; however, while the dark portion of the document is located right above the tube wall, the above-mentioned re-reflection is no longer exerted, the corresponding characteristic tends to form a curve that is close to the illuminance distribution curve 19. Here, the AGC should not be applied to the change of this type immediately. The reason for this is because, since the dark portion of the document successively enters the reading range, the immediate application of the AGC fails to recognize this document portion as a dark portion accurately, resulting in a failure in carrying out the faithful image reproduction.

In order to solve the problem of re-reflection of light that has once hit the document face, a method has been proposed in which a ratio of quantities of light within a predetermined range is specified (for example, see page 2, paragraphs 0007 to 0010, and FIG. 6 of Japanese Patent Application Laid-Open No. 2001-222076). In this method, although it is possible to solve the re-reflection from the document platen glass, no solution is given to the problem of the re-reflection from the tube wall of a Xe lamp or the like used as the light-source.

Another arrangement has been proposed in which the illumination light is converged to a narrow range so that the necessity of having to consider the illuminance other than the reading range is eliminated (for example, see page 4, paragraphs 0025, and FIG. 3 of Japanese Patent Application Laid-Open No. 2002-125098). Although these arrangements are superior in preventing the generation of re-reflection, these arrangements generally cause a chevroned illuminance distribution unless a special contrivance is prepared, with the result that, in the case of a color-image reading process using a three-line CCD, another problem is raised in that the luminances of the three colors are not made equal to one another.

SUMMARY OF THE INVENTION

It is an object of the present invention to solve at least the problems in the conventional technology.

An illumination device according to an aspect of the present invention is used in a document-reading device configured to irradiate light over at least a predetermined illumination width including a reading area having a predetermined reading width extending in a main scanning direction of a document and to read the light reflected from the document using an image-reading element. The illumination device has a point light source; and a light-guiding member having an incident surface opposed to a light-emitting surface of the point light source and a light-emitting surface opposed to the reading area; wherein an illumination area generated by the light irradiated from the point light source has a high illuminance distribution range of a substantially constant illuminance, and the high illuminance distribution range coincides substantially with the reading area.

A document reading device according to another aspect of the present invention has the illumination device according to the above aspect.

An image forming apparatus according to still another aspect of the present invention has the document reading device according to the above document.

An adjusting device according to still another aspect of the present invention is configured to adjust an illumination device used in a document-reading device configured to irradiate light over at least a predetermined illumination width including a reading area having a predetermined reading width extending in a main scanning direction of a document and to read the light reflected from the document using an image-reading element. The illumination device includes a point light source; a light-guiding member having an incident surface opposed to a light-emitting surface of the point light source and a light-emitting surface opposed to the reading area; a first carriage configured to shift an illumination area in a sub-scanning direction; and a support base configured to support and hold the point light source and the light-guiding member together as a unit, and to be attached to the first carriage adjustably in the sub-scanning direction, wherein the illumination area generated by the light irradiated from the point light source has a high illuminance distribution range of a substantially constant illuminance, and the high illuminance distribution range coincides substantially with the reading area.

A document reading device according to still another aspect of the present invention has the adjusting device according to the above aspect.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 20 is a drawing that depicts a conjugate relationship between a document face and a CCD;.

FIG. 21 is a drawing that depicts an illuminance distribution in a sub-scanning direction of a document face in accordance with a conventional light source; and FIG. 22 is a drawing that explains an illuminance distribution of a compatible-type scanner.

DETAILED DESCRIPTION

Referring to figures, the following description will discuss embodiments in accordance with the present invention.

Figure 1:
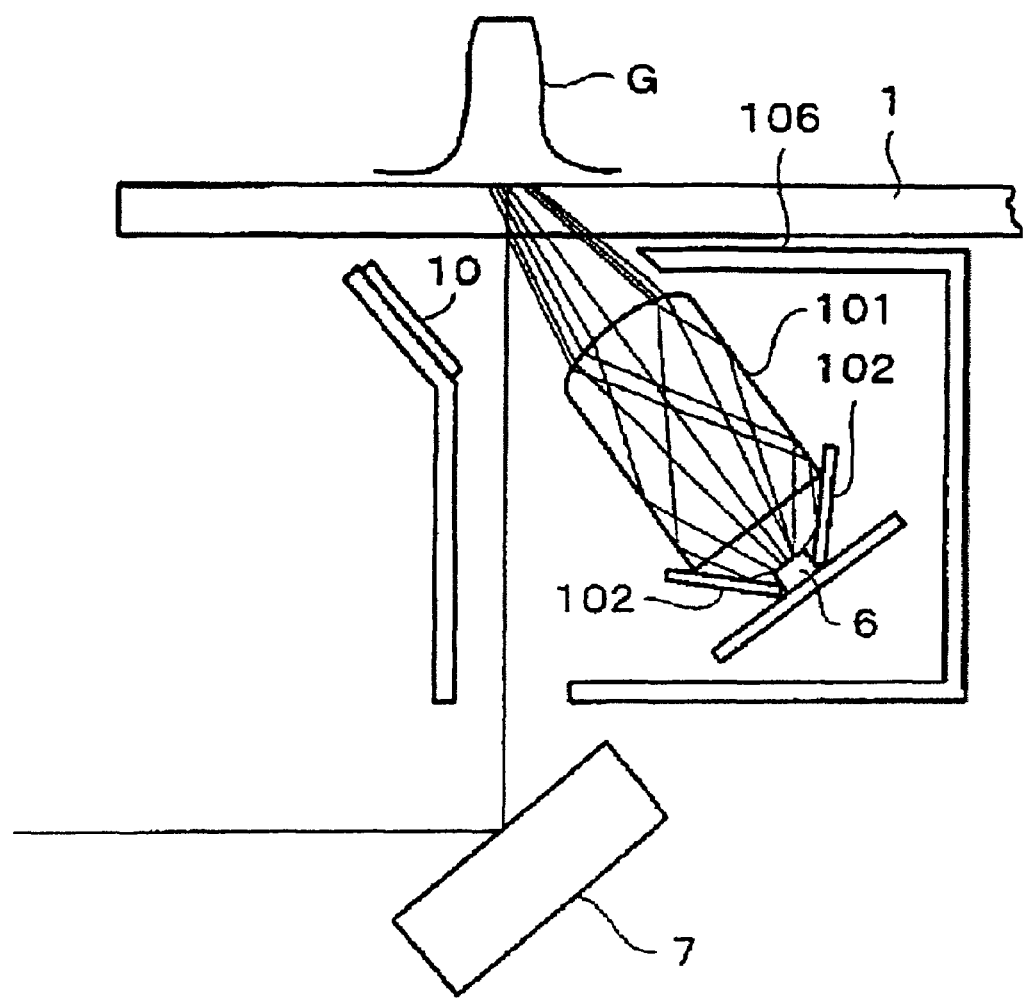
FIG. 1 is a drawing that explains an embodiment of the present invention.
Figure 2:
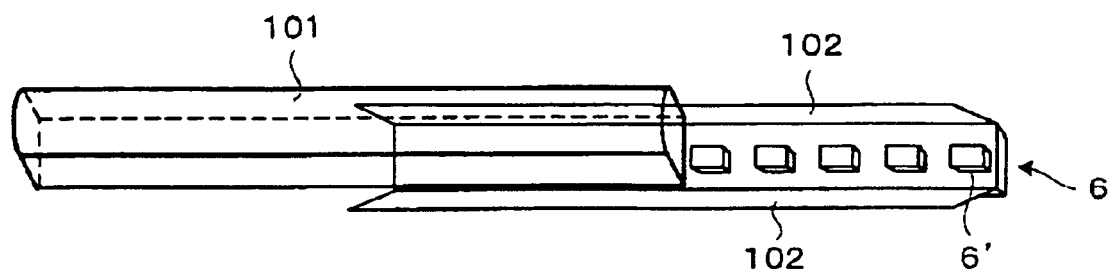
FIG. 2 is a drawing that explains the embodiment of the present invention.

FIGS. 1 and 2 are drawings that explain embodiments of the present invention. FIG. 1 is a cross-sectional view in the sub-scanning direction, and FIG. 2 is a partial exploded perspective view.

Figure 19:
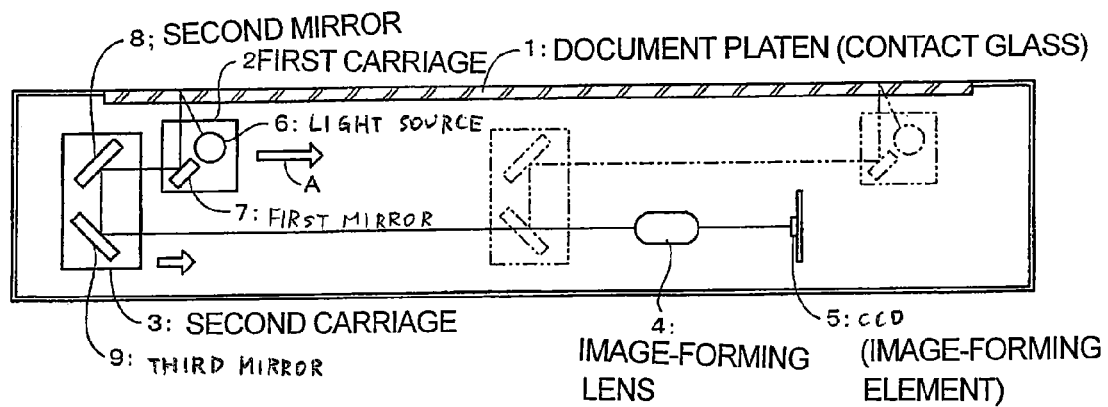
FIG. 19 is a schematic block diagram that depicts a reading device.

In both of these figures, reference numeral 101 is a light-guiding member, 102 is a reflection plate, 106 is a light-shielding member and G represents an illuminace distribution, respectively. The other reference numerals are the same as those shown in FIG. 19.

A light source 6 is constituted by a plurality of point light source LEDs 6' arranged in the main scanning direction. The light-guiding member 101 is a cylindrical lens with a fixed width that extends long in the main scanning direction, and has its light-incident surface facing the light-emitting surface of the LEDs 6', with its light-emitting surface facing a document reading area. The reflection plate 102 is arranged so that light rays other than the light rays that have been directly made incident on the light-guiding member 101 from the light source 6 are directed to the light-guiding member 101.

In FIG. 1, the cylindrical lens having a flat-convex structure is shown; however, a convex-convex structure or a concave-convex structure of a meniscus type may be used as long as it has a positive refractive force. With this arrangement, as shown by an illuminance distribution indicated by G, a virtually flat distribution is obtained on the sides of a maximum illuminance, and the illumination area is also narrowed to a width considerably close to the width of a predetermined reading area. Here, the virtually constant illuminance distribution range near the maximum illuminance is referred to as a high illuminance distribution range. The high illuminance distribution range is preferably made virtually coincident with the reading area.

The number of the LEDs 6' that are aligned in the main scanning direction is determined in association with light-quantity irregularities in the main scanning direction. The greater the number, the more effectively the irregularities are reduced; however, in association with costs, an attempt is made to reduce the number to such a degree capable of limiting the irregularities in light quantity to a permissible range.

A light-shielding member 106 is placed between the light-guiding member 101 and the contact glass 1. The light-shielding member 106 may be formed by extending one portion of the casing of the first carriage. Since light rays, released from the light-guiding member, have a good converging property, little stray light is generated even when used as they are; however, when the light-shielding member 106 is placed in a manner so as to shield light rays that reach the document face right above the light-guiding member, it is possible to further shield unnecessary illumination light to the document face.

The distance between the light-guiding member 101 and the light source 6 is determined in the following manner: From the viewpoint of the sub-scanning cross section, the light-guiding member 101 has a lens function. In the figure, the face facing the light source 6 side, that is, the incident surface, is prepared as a flat face, and the face facing the contact glass, that is, the light-emitting surface, is prepared as a convex face. The light source 6 is placed near the focal point position on the incident surface side of the light-guiding member 101. More specifically, the distance is determined based upon the relationship among the reading width of the document, the width of the light-guiding member 101 and the irradiation angle with respect to the document face.

In the case when, supposing that the irradiation angle is tilted by 60° with respect to the normal to the document face, the reading width is 3 millimeters, by setting the width of the light-guiding member to 3 mm×√(3)/2=2.6 mm, the resulting released light rays are prepared as suitable parallel light rays. Therefore, in this case, with respect to the light source 6, its center in the sub-scanning direction is preferably made coincident with the focal line position on the incident surface side of the light-guiding member 101, that is, the-focal point position in the cross section. In general, the size of the LED 6' in the sub-scanning direction is approximately 0.5 millimeters; therefore, even when this size is ignored, there is not so much error.

Since, in actual operations, it is quite difficult to manufacture a light-guiding member having an elongated shape with a width of 2.6 millimeters, suppose that, for example, a light-guiding member with a width of 5.2 millimeters is used. In an attempt to converge light rays so that the width of light rays is 2.6 millimeters in the center of the reading position, the arrangement is made so as to converge the image of the LED 6' at a position with twice the distance from the light-guiding member 101 to the document face. This arrangement is achieved by increasing the distance between the light-guiding member 101 and the LED 6' in comparison with the case in which the light rays are made in parallel with one another. The amount of the increase is specifically determined by the focal point distance of the light-guiding member 101 and the distance between the light-guiding member 101 and the center of the reading position. Here, since the degree of the focal point distance of the light-guiding member in the example is quite small, the amount of change from the focal point position that is required for converging the-light rays is not so large.

For another method, the position of the cylindrical lens may be selected so as to make the width of the point light source in the sub-scanning direction is formed as an image with a size corresponding to the size of a predetermined reading width. Here, supposing that the point light source having a width of 0.5 millimeters is image-formed with a width of 2.6 millimeters, an image forming magnification of 5.2 times is prepared. The LED 6' and the center of the reading area are preferably placed with a conjugated relationship so as to provide this magnification.

Figure 3A:
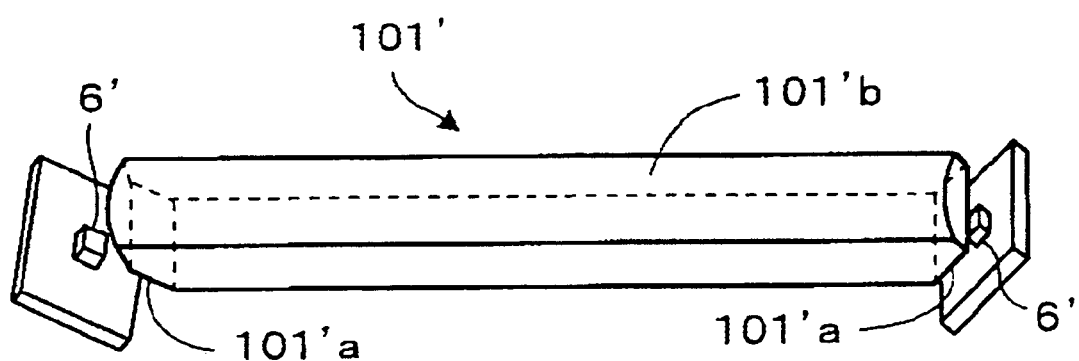
FIG. 3 is a drawing that explains another embodiment of the present invention.
Figure 3B:
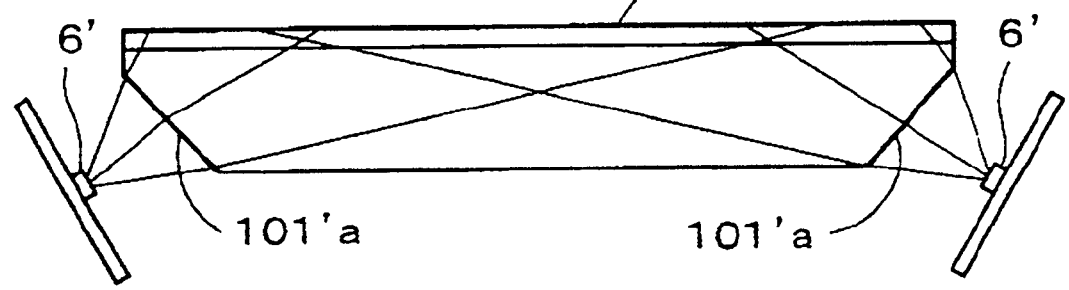

FIG. 3 is a drawing that explains another embodiment of the present invention. FIG. 3A is a perspective view depicting an essential portion, and FIG. 3B is a cross-sectional view in the main scanning direction.

In this figure, reference numeral 101' represents a light-guiding member.

The light-guiding member 101', which is basically formed by a flat-convex cylindrical lens, is placed near the reading area with the convex face side serving as a light-emitting surface 101'b.

The present embodiment uses two LEDs 6' as the light source 6, and has a structure in which light rays are made incident on the facet of the light-guiding member in the length direction. When the light rays are made incident on the facet of the light-guiding member 101 shown in FIG. 2 in the length direction, many light rays are allowed to proceed straight to be released from the opposing face, with the result that the light rays to be released toward the reading area from the light-guiding member 101 become fewer. Therefore, as indicated by the light-guiding member 101' shown in FIG. 3, a slanting face is formed from the light-emitting surface of light rays on the end portion in the length direction to the opposite side so that an incident surface 101'a of light rays is prepared.

The LED 6' is placed virtually face to face with the incident surface 101'a so that main light rays are made incident on the light-guiding member 101' from the incident surface 101'a. Since light rays have such a characteristic that they are diffused to become weaker as they travel farther, the arrangement as shown in the figure in which the light rays are applied from both of the sides makes it possible to easily obtain uniform illumination. Although light rays that leak to portions other than the incident surface through a space between the LED 6' and the incident surface 101'a are omitted from the figure, a reflection plate having the same structure as the reflection plate 102 shown in FIG. 2 may be installed. In this case, since one LED 6' is attached to each of the facets, four reflection plates are preferably placed so as to surround the incident surface 101'a having a square shape along its four sides.

Moreover, with respect to the light-guiding member 101', all the faces except for the incident surface 101'a and the light-emitting surface 101'b of light rays are preferably prepared as reflection faces. With respect to the method for forming the reflection face, for example, a reflection member made of, for example, high luminance aluminum may be bonded, or a method such as aluminum vapor deposition may be used to prepare a reflecting function.

In the case of a method such as aluminum vapor deposition, upon vapor deposition, by using a mask, a specific portion can be partially protected from the vapor deposition, and by using this method, the degree of reflection can be made different depending on portions. In other words, those portions closer to the LED 6' may be made smaller in the reflecting property thereof, while those portion farther therefrom may be made greater in the reflecting property. When an LED having high luminance can be used, this method makes it possible to obtain a desired illuminance distribution even when only one LED is used to apply light from one side of the facets of the light-guiding member 101' in the length direction. Alternatively, with respect to the illumination from one side, two or more LEDs may be aligned in the sub-scanning direction. This arrangement is applicable to such an arrangement in which a predetermined reading width is wide.

The incident angle of light rays with respect to the light-emitting surface 101' becomes smaller on the side farther from the LED 6', and tends to form an all-reflection area. In order to avoid this problem, an anti-reflection film may be more preferably formed on the light-emitting surface 101'b by using a multi-layered film or the like.

Figure 4:
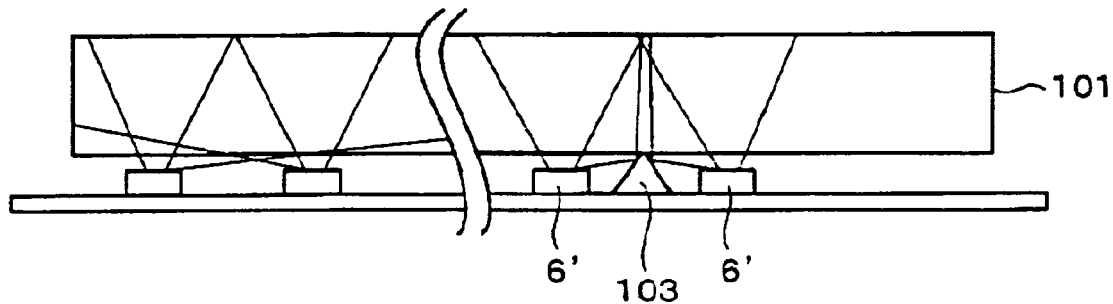
FIG. 4 is a drawing that depicts a cross section in a main scanning direction of the present embodiment.

FIG. 4 is a drawing that depicts a cross section of the present embodiment in the main scanning direction.

In this figure, reference numeral 103 represents a reflection member.

With respect to the main scanning direction, the LEDs 6' are properly arranged in the density thereof so that illumination light derived from light rays of the LEDs 6' is allowed to have such a uniformity so as not to cause image irregularities in the document reading process. When the incident angle of the light rays from the LEDs 6' to the light-guiding member 101 is too great, the illumination light is applied to a position far away from the LEDs 6' as shown on the left side of the figure, with the result that it becomes difficult to control the distribution; therefore, as shown on the right side of the figure, the reflection member 103 is preferably placed so as to direct the light rays toward the light-guiding member 101. In this figure, the reflection member 103 has a triangular shape in its cross section; however, the reflection member 103 is preferably formed into a trapezoidal shape with a flat top portion so that this portion is utilized as a receiving portion of the light-guiding member 101 so as to make the attaching process of the LEDs 6' easier.

Although not shown in figures, the LEDs 6' are not limited to a single row, and a plurality of rows thereof may be placed in the sub-scanning direction when the predetermined reading width is wide.

Figure 5:
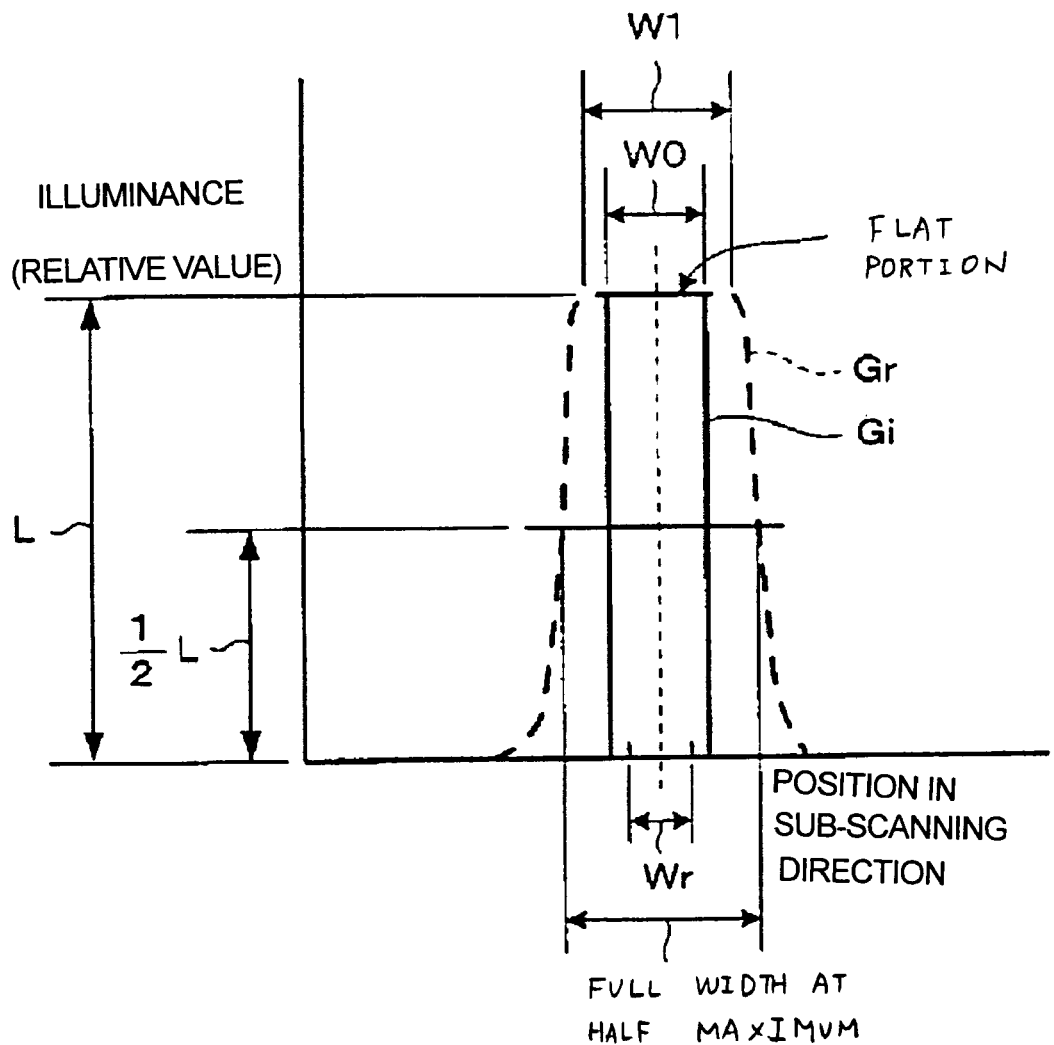
FIG. 5 is a drawing that depicts an optimal illuminance distribution in a cross section in a sub-scanning direction.

FIG. 5 is a drawing that depicts an optimal shape of the illuminance distribution in the cross section in the sub-scanning direction.

In this figure, code Wr represents a predetermined reading width, W0 represents a predetermined illumination width and L represents a sufficient illuminance required for a reading process.

In the figure, a graph Gi, indicated by a solid line, represents an optimal illuminance distribution that illuminates only the area required for the reading process. A graph Gr, indicated by a broken line, represents a general form of illuminance distribution that tends to be actually generated.

The illumination device is formed by laminating a plurality of parts; therefore, even when each part is formed within a range of a permissible production error (tolerance), the illuminated position has a slight deviation due to the errors. In order to always illuminate the reading position even when each of the parts has any deviation within the tolerance, the predetermined illumination width W0 needs to be set greater than the predetermined reading width Wr. The following description discusses how to determine the predetermined illumination width W0.

Figure 6:
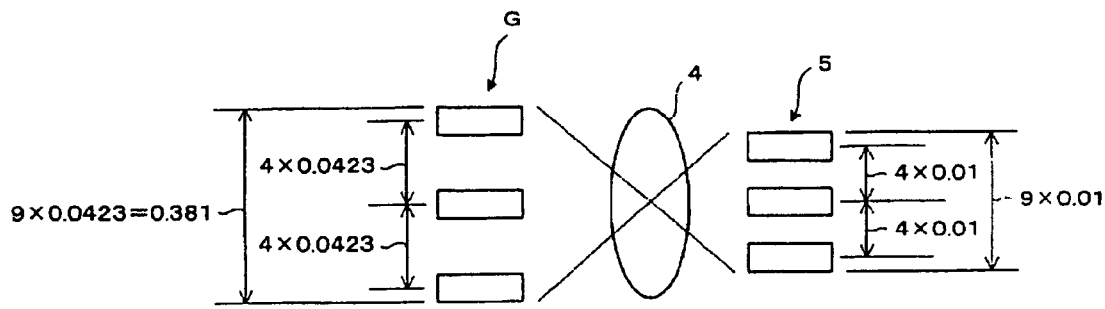
FIG. 6 is an illustration of a relationship between a reading width at a reading position and a reading width of an image-reading element.
Figure 7:
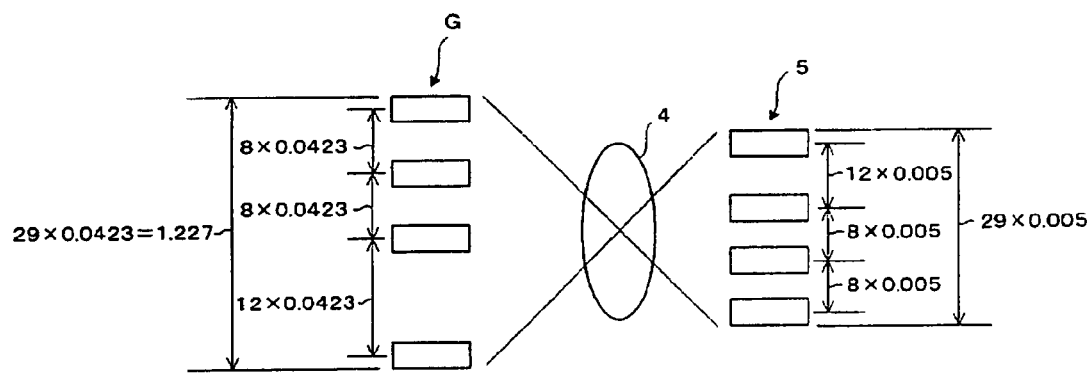
FIG. 7 is an illustration of a relationship between a reading width at a reading position and a reading width of an image-reading element.
Figure 8:
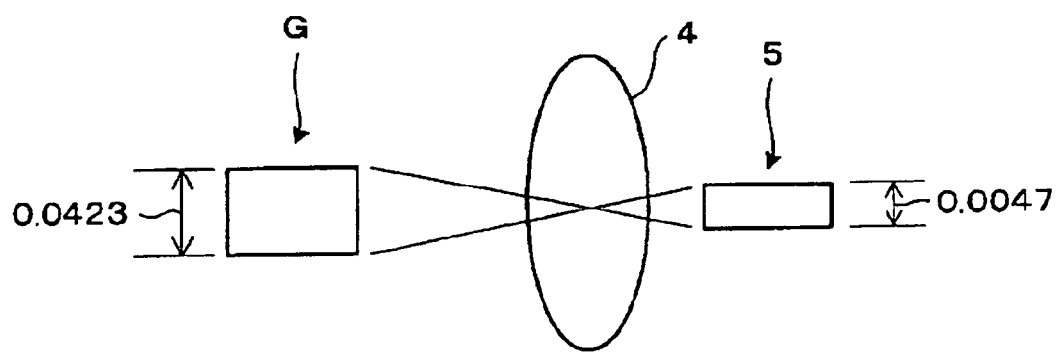
FIG. 8 is an illustration of a relationship between a reading width at a reading position and a reading width of an image-reading element.

FIGS. 6 to 8 are drawings that relate to the reading width of the image-reading element in the sub-scanning direction, that is, the predetermined reading width at the reading position that corresponds to the light-receiving width. FIG. 6, FIG. 7 and FIG. 8 are drawings that respectively depict a three-color-use CCD, a four-color-use CCD including black and a monochrome-use (mono-color) CCD, and also indicate correlations among these CCDs. These figures exemplify cases in which a document is read at a rate of 600 DPI.

In the CCD 5 shown on the right side of the image forming lens 4 in FIG. 6, three line sensors having a width of 0.01 millimeter are aligned with a gap of 0.04 millimeter. In contrast, at the document position G shown on the left side of the image forming lens, the respective parts including the lenses are arranged so that lines corresponding to the three colors are read with an empty space corresponding to four lines being placed in between, with the reading width of one line being set to approximately 0.0423 millimeter. Thus, the document position and the CCD position have a conjugate positional relationship with respect to the image forming lens 4. The predetermined reading width Wr is set to approximately 0.381 millimeter and the image forming magnification is set to ¼.23 when viewed from the document side.

In the case of FIG. 7, a line sensor exclusively used for a mono-chrome process is added to the three-color-use line sensor shown in FIG. 6 at a position slightly apart from the line sensor. The CCD shown here has a sensor width of 0.005 millimeter with a line sensor gap eight times as wide as the width of the sensor. The mono-chrome-use sensor is placed at a position with a distance twelve times as wide as the sensor width.

When the reading width Wr is found based upon the same idea as described above, Wr=1.23 millimeters, and in the same manner, the image forming magnification is set to ⅛.47.

In the case of FIG. 8, a CCD made of one line sensor having a width of 0.0047 millimeter is used. In this case, the reading width is the smallest, and only Wr=0.0423 mm is required. In this case, the image forming magnification is set to ⅑.

Here, with respect to the image-reading element, line sensors other than CCDs, such as PDAs, may be used.

Figure 9:
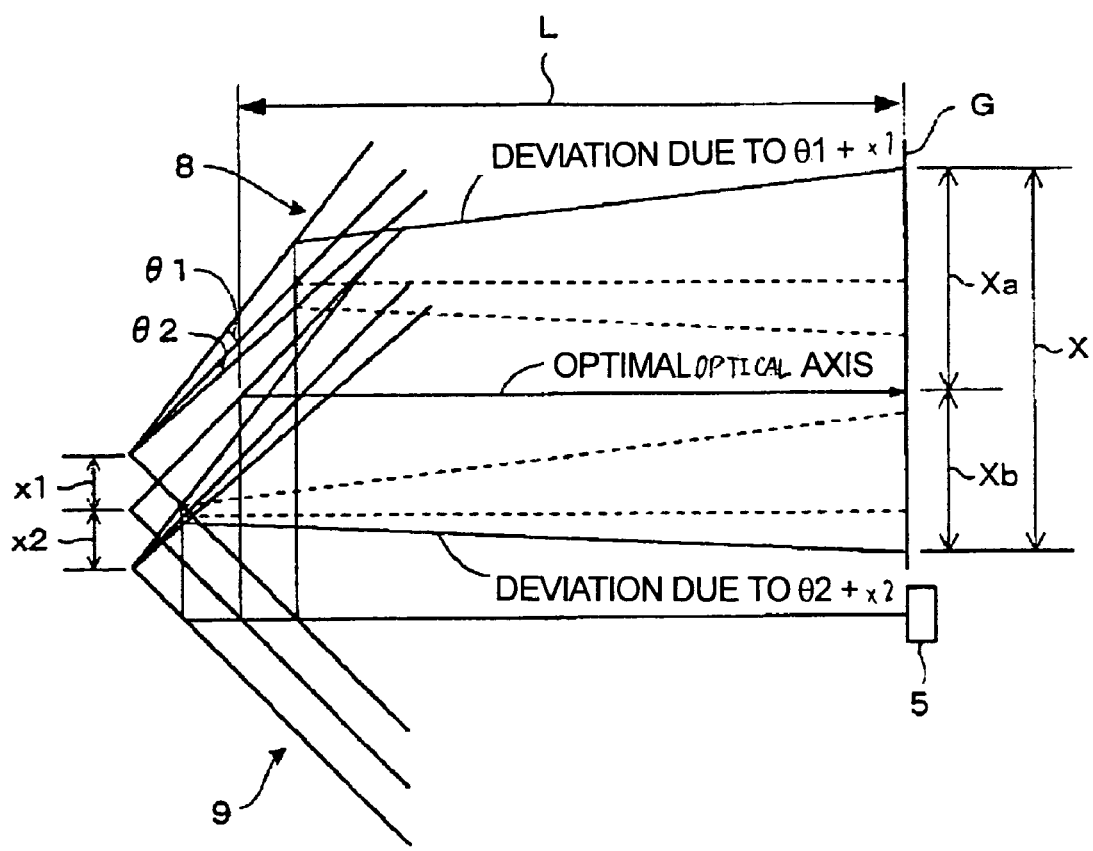
FIG. 9 is a drawing that explains a fluctuation of the reading position due to a production error.

FIG. 9 is a drawing that explains a change in the reading position due to production errors.

In this figure, code $\theta$ represents an angular error of the second mirror, x represents an error of the upper and lower positions of the second carriage, and X represents a width of fluctuation caused by a manufacture tolerance of a part or the like.

For example, this figure depicts a deviation in the reading light rays when the second carriage 3 deviates in a longitudinal direction from the designed position, with the second mirror 8 deviating from the designed angle. Here, this figure depicts the case on the assumption that there are no errors in the other parts.

In the figure, $x_1$ and $x_2$ represent maximum amounts of dislocation in the second carriage 3 in the longitudinal direction, $\theta_1$ and $\theta_2$ represent maximum amounts of dislocation in the angle of the second mirror, and Xa and Xb represent the resulting amounts of maximum deviations from the designed position of the reading position. The equation, X=Xa+Xb, corresponds to the margin for the manufacturing error. In other words, the predetermined illumination width W is defined by W0=Wr+X.

When the second carriage 3 is shifted by the largest displacement $x_1$ in the upper direction of the figure, with the second mirror 8 being tilted by the largest angle $\theta_1$, the reading position on the document face G has the greatest amount of deviation Xa in the upper direction. In the same manner, the greatest amount of deviation Xb in the lower direction is indicated by the combination of $x_2$ and $\theta_2$.

Here, there are many other factors that cause deviations in the reading position from the designed value; therefore, when tolerances are accumulated, as they are, the amount of deviation in the reading position becomes a size that is not applicable to practical operations. For this reason, normally, an adjusting portion is installed in any one of light paths from the document to the CCD so as to absorb these errors. Nevertheless, since it is not possible to completely eliminate final errors, the permissible error of the reading position in the document position is determined to, for example, Xa=Xb=0.1 mm in the case of a color machine and Xa=Xb=0.5 mm in the case of a monochrome machine.

The predetermined illumination width W0, which is formed by adding a margin for absorbing the permissible error to the reading width Wr derived from the CCD size, is determined by combinations of the CCD structure, the reading resolution and the like, and when the permissible error is applied to the examples shown in FIGS. 6 to 8, W0=0.581 is obtained in the case of FIG. 6. In the case of FIG. 7 that has a monochrome sensor at one of the ends, the permissible error on the color side is 0.1 millimeter and the permissible error on the monochrome side is 0.5 millimeter so that W0=1.83 mm. In the case of FIG. 8, the sum is simply found so that W0=1.0423 mm.

The light source device is ideal when it can illuminate the predetermined illumination width W0 without any deficiency and excess; however, there are some factors that cause errors also on the light source side, such as a set angle of the light-guiding member and a relative position thereof to the LED. The installation of the adjusting mechanism for absorbing these errors is a normally used method; however, it is still difficult to eliminate the errors finally. For this reason, the actual illumination width W1 is provided with a margin a for the errors that the adjusting mechanism can not absorb so that the light source device is designed so as to satisfy W1=W0+$\alpha$.

In the light source device as shown in FIG. 1, when the predetermined actual illumination width W1 is illuminated with virtually uniform illuminance L as-the high illuminance distribution range, it is not possible to set the illuminance on the periphery of the range to 0, which is an ideal value. However, as described in the explanation of the background of the invention, it is preferable to prevent the illumination light from reaching the outside of the range, if possible. As shown by a broken line in FIG. 5, it is preferable to prepare such a distribution as to allow the illuminance to abruptly drop at the area exceeding the actual illumination width W1. Here, a width obtained by connecting the positions that make the illuminance half the value of the largest illuminance L, that is, L/2, is referred to as a full width at half maximum, and the present embodiment aims to set the full width at half maximum to a value within three times the predetermined illumination width W0, preferably, within two times the predetermined illumination width W0. With respect to the case of three times, the point of the half-value level has a width of the spew amount on one side from the predetermined illumination width W0 that is equal to W0.

In the example of FIG. 7, since W0=1.8 mm, the full width at half maximum of the illuminance distribution in this case is 5.4 millimeters with the spew width from the predetermined illumination width W0 being set to 1.8 millimeters on one side. In this manner, since the width is very small and since the illuminance at this position is set to half the largest illuminance L, a difference in re-reflections caused by a difference in the illuminance on the document at this position hardly gives any influences to the illuminance at the reading position.

Figure 10:
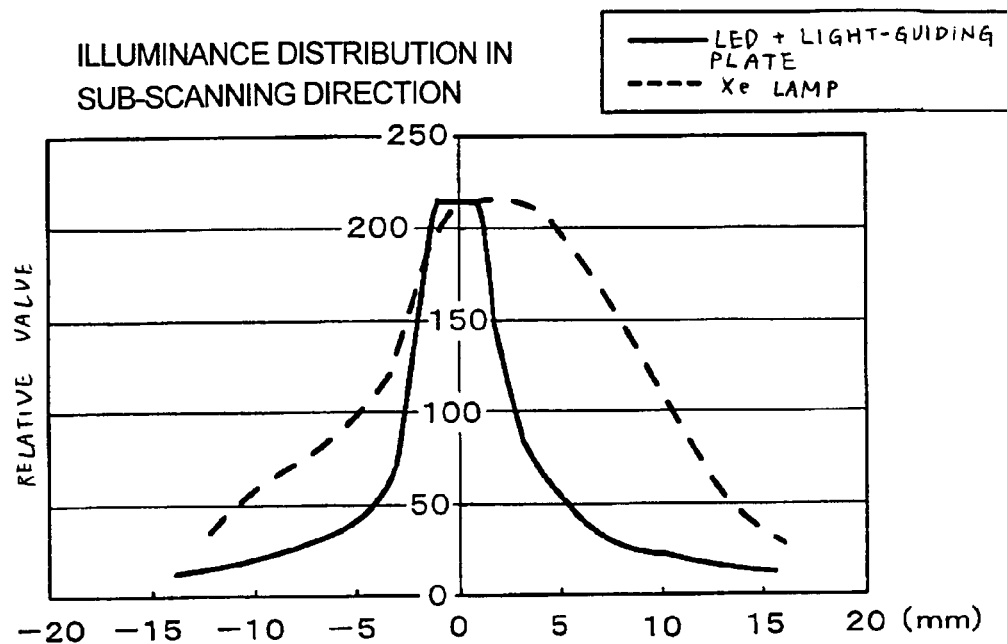
FIG. 10 is a drawing that depicts one example of an illuminance distribution given by a light source device having an arrangement shown in FIG. 1.

FIG. 10 is a drawing that depicts one example of an illuminance distribution caused by a light source device having the structure shown in FIG. 10.

In this figure, a solid line represents the illuminance distribution of the present invention, and a broken line represents an illuminance distribution caused by a conventional xenon lamp. In the present embodiment, the predetermined illumination width W0=2.5 mm, the actual illumination width W1=2.9 mm, and the full width at half maximum is 7.5 millimeters that is just three times as great as W0. In the case of the conventional illuminance distribution indicated by the broken line, the full width at half maximum was 23.2 millimeters that is not less than 9 times as great as the predetermined illumination width W0. In particular, in-the document area right above the light source, the spew amount from the predetermined illumination width W0 is about 17 millimeters, which reaches 6.7 times as large as W0 even on one side.

In the above description, the high luminance distribution range of the actual illumination width W1 has been dealt as if it were indicated by a fixed value as the largest illuminance L; however, as also shown in the illuminance distribution in FIG. 10 slightly, even though it is virtually a fixed value, there are slight fluctuations when viewed microscopically. There are a plurality of maximum values as well as a plurality of minimum values even within a range having virtually constant illuminance. The largest value among the maximum values is defined as Lmax, and the smallest value among the minimum values is defined as Lmin. Similar to the definition in surface roughness in an object, the definition of the degree of flatness $\delta$ in illuminance is determined as follows:

$$\delta = (L\max - L\min)/L\max$$

The expression inside the parentheses indicates a width of fluctuations. Although the denominator should be originally given by the mean value of the illuminance of this range, the mean value is not obtained easily; therefore, the largest value, which is measured most easily, is used as the denominator.

With respect to the degree of flatness $\delta$ of illuminance, since the smaller the numeric value, the higher the degree of flatness; therefore, this is ideally set to 0. However, it is actually not possible to set it to 0, a permissible value is preferably determined. In the case of a color reading process, the color balance sometimes tends to deteriorate when the degree of flatness is poor. With respect to the limit value at which no clear deterioration occurs in the color balance, $\delta$ is preferably set within 12%. In the case of a monochrome reading process, since the reading data is converted to binary values in most cases, no reading error occurs up to about 30% of $\delta$, when the threshold value of binarization is set to a density of 50%. However, in an attempt to reproduce photographs, the degree of flatness as high as the color process or higher than the color process is required.

Figure 11:
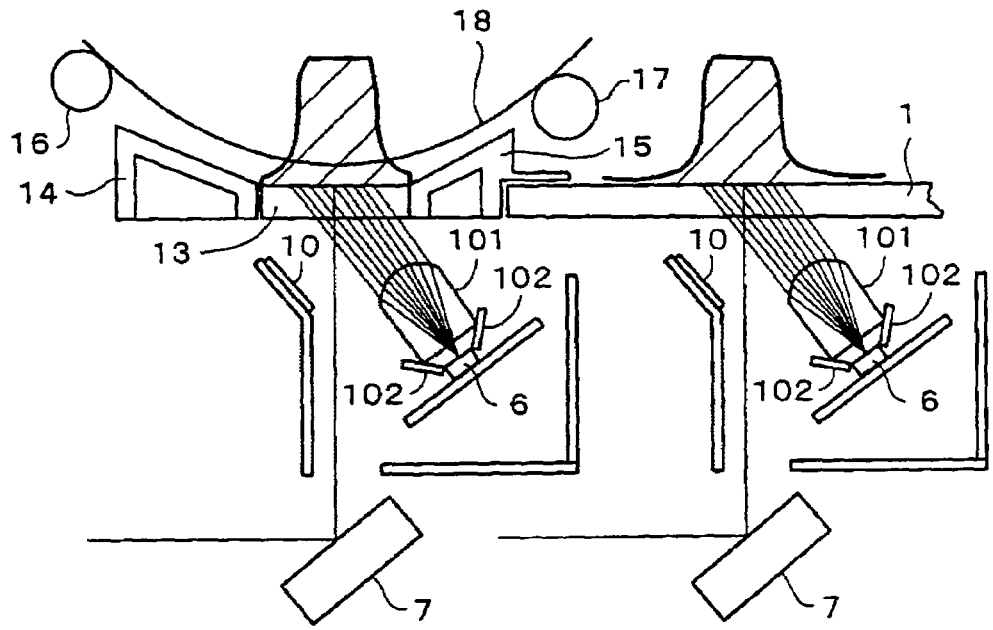
FIG. 11 is a drawing that explains effects of the light source device in accordance with the present invention.

FIG. 11 is a drawing that explains the effects of the light source device in accordance with the present invention.

In this figure, the graph of an illuminance distribution is schematically prepared.

In accordance with the present invention, in a reading device of a document-shifting type, the illumination width of the light source device is virtually included in the width of an ADF-use contact glass plate 13. Although the edge area of the illuminance distribution is slightly shielded by opaque members 14 and 15, this area is located out of the reading range so that no effects are given to the reading operation of the document-shifting type.

Upon sifting to the reading system of a fixed document type, the above-mentioned edge area of the illuminance distribution is located right above the light source device, this system seems to have the same problems of re-reflection as the conventional system; however, since the quantity of light in this edge area is very small in comparison with the entire quantity of light, the re-reflection light gives hardly any influences to the quantity of reading light.

Figure 12:
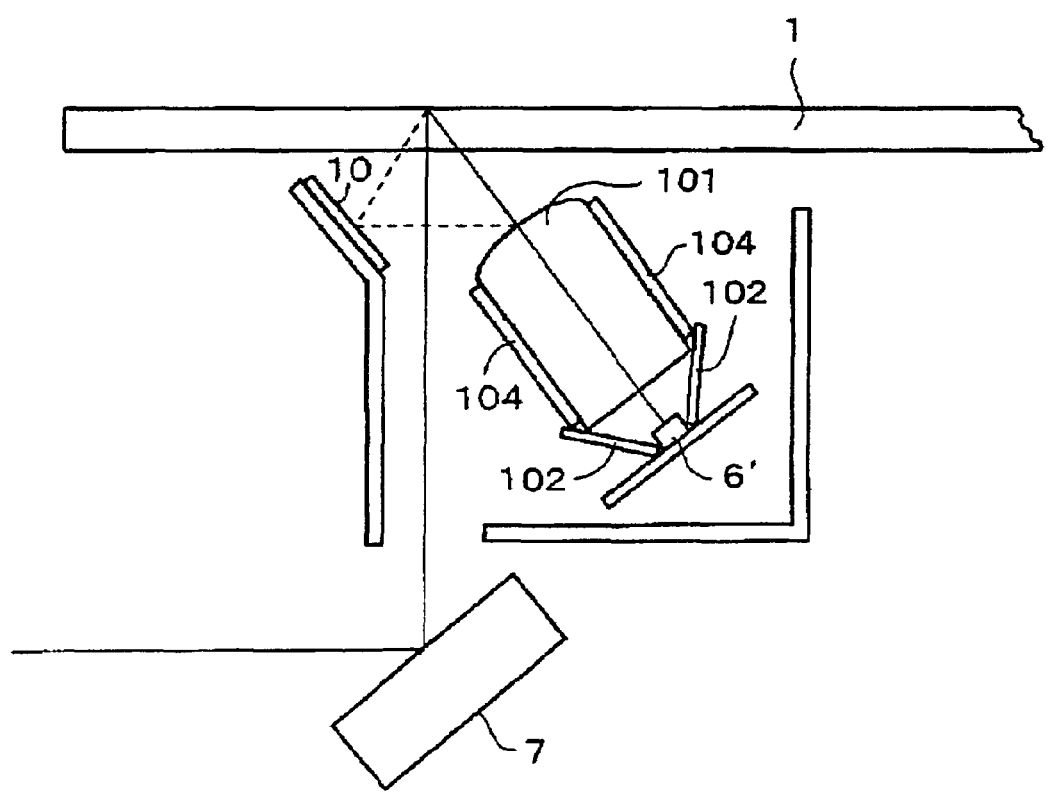
FIG. 12 is an illustration of still another embodiment.

FIG. 12 is a drawing that depicts still another embodiment of the present invention.

In this figure, reference numeral 104 represents a reflection member.

This reflection member 104 is attached to the side face of the light-guiding member 101 over the entire area in the length direction. Another member may be bonded to the light-guiding member 101 as the reflection member 104, or a mirror face may be formed thereon through aluminum vapor deposition or the like.

This arrangement allows light that would be otherwise released from the side face of the light-guiding member depending on angles, among light rays from the LED, to return to the illumination area.

Figure 13:
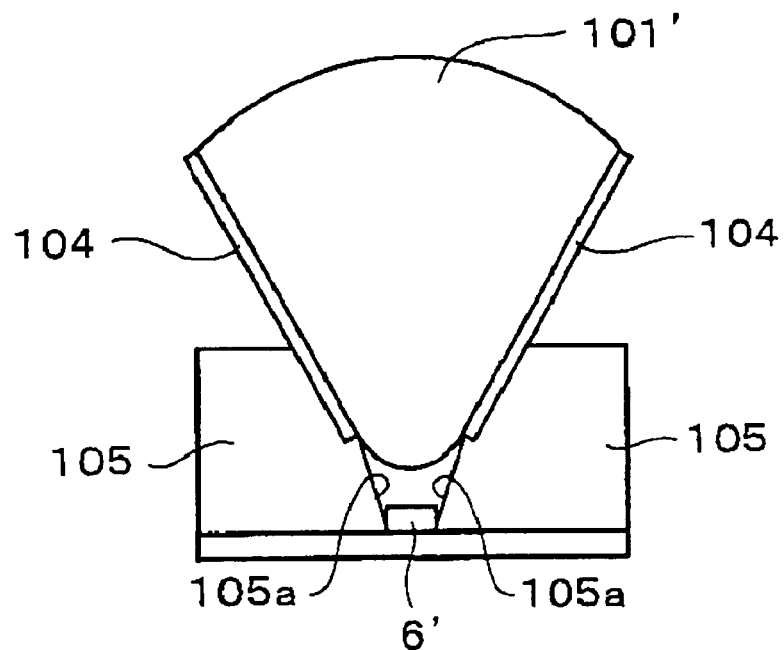
FIG. 13 is an illustration of still another embodiment.

FIG. 13 is a drawing that depicts still another embodiment of the present invention.

In this figure, reference numeral 105 represents a reflection member compatibly used as a reinforcing member.

The present embodiment features that the two side faces of the light-guiding member 101' are not in parallel with each other. The light-incident surface that faces the LED has a small opening width that can cover the light-emitting surface of the LED, with the light-emitting surface having an opening width that is greater than the above-mentioned opening width.

Originally, diverged light rays from the LED are continuously diverged even in the light-guiding member, and formed into parallel light rays or converging light rays when released from the light-emitting surface; therefore, the main light rays are not different from those shown in the structure of FIG. 1. The light rays, which have reached the reflection face of a side face in the light-guiding member, are reflected by the reflection face, and in this arrangement, since the reflection faces on the two sides have an opening angle with respect to the advancing direction of light rays, the advancing direction of the light rays after reflection is not changed so much, and allowed-to easily reach the reading area.

The face 105a of the reflection member 105 compatibly used as a reinforcing member, which faces the LED, serves as the reflection plate 102 shown in FIG. 1, and also serves as a reinforcing member for the LED substrate as a whole. The upper opening section thereof is also compatibly used as a receiving base for the light-guiding member 101'.

With this arrangement, the elongated LED substrate becomes less susceptible to warping, and the positioning of the light-guiding member 101' is more easily carried out, with high assembling precision; thus, it becomes possible to easily carry out the assembling processes.

Since the figure is a cross-sectional view, two reflection members 105 compatibly used as reinforcing members are shown; however, these may be connected to each other at portions having no LEDs into an integral part so that it becomes possible to provide higher assembling precision.

Figure 14:
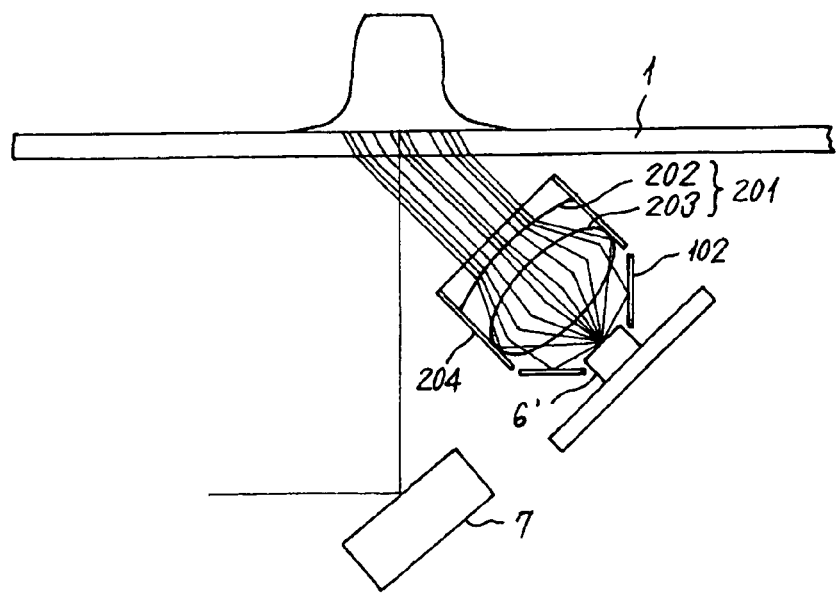
FIG. 14 is an illustration of still another embodiment.

FIG. 14 is a drawing that depicts still another embodiment of the present invention.

In this figure, reference numeral 201 represents a light-guiding member, 202 represents a concave-lens-based cylindrical lens, 203 represents a convex-lens-based cylindrical lens, and 204 represents a reflection member, respectively.

In the present embodiment, the light-guiding member 201 forms a composite member having a set of two lenses of a convex-lens-based cylindrical lens and a concave-lens-based cylindrical lens, and the composite structure exerts a positive refracting force.

When viewed in a cross section in the sub-scanning direction, a point light source 6' is placed at a position far from the focal point of the convex cylindrical lens 203 (hereinafter, the cylindrical lens is referred to simply as lens for convenience of explanation by reference to the cross-section) on the point light source 6' side. Diverging light rays, released from the point light source 6' and allowed to enter the convex lens 203, are released from the light-emitting surface as converging light rays. These converging light rays are made incident on the concave lens 202, and when the converging point of the converging light rays is placed with a positional relationship in a manner so as to coincide with the focal point of the concave lens 202 on the document side, the light rays, released from the concave lens 202 are released as parallel light rays that are in parallel with the optical axis.

With this arrangement, the light rays, released from the point light source 6' and diverged with wide angles, can be converted to parallel light rays within a narrow range. Therefore, when the center light ray is made virtually coincident with the center of the reading area, it becomes possible to virtually uniformly illuminate the reading area. When a combination of the convex lens and the concave lens is selected in a manner so as to make the high luminance distribution range virtually coincident with the reading area, it is possible to avoid illuminating unnecessary areas, and consequently to improve efficiency of utilization of light rays. Since the illumination light is made incident on the contact glass with a certain angle, refraction occurs on the glass surface. Therefore, when an attempt is made to make the high illuminance distribution range coincident with the reading area, this refracted component needs to be always taken into consideration.

In the present embodiment, the position at which the point light source is placed is consequently coincident with the composite focal line position between the convex lens and the concave lens.

The reflection member 204 is preferably used as a holding member that holds the convex lens 203 and the concave lens 202 in a compatible manner.

Figure 15:
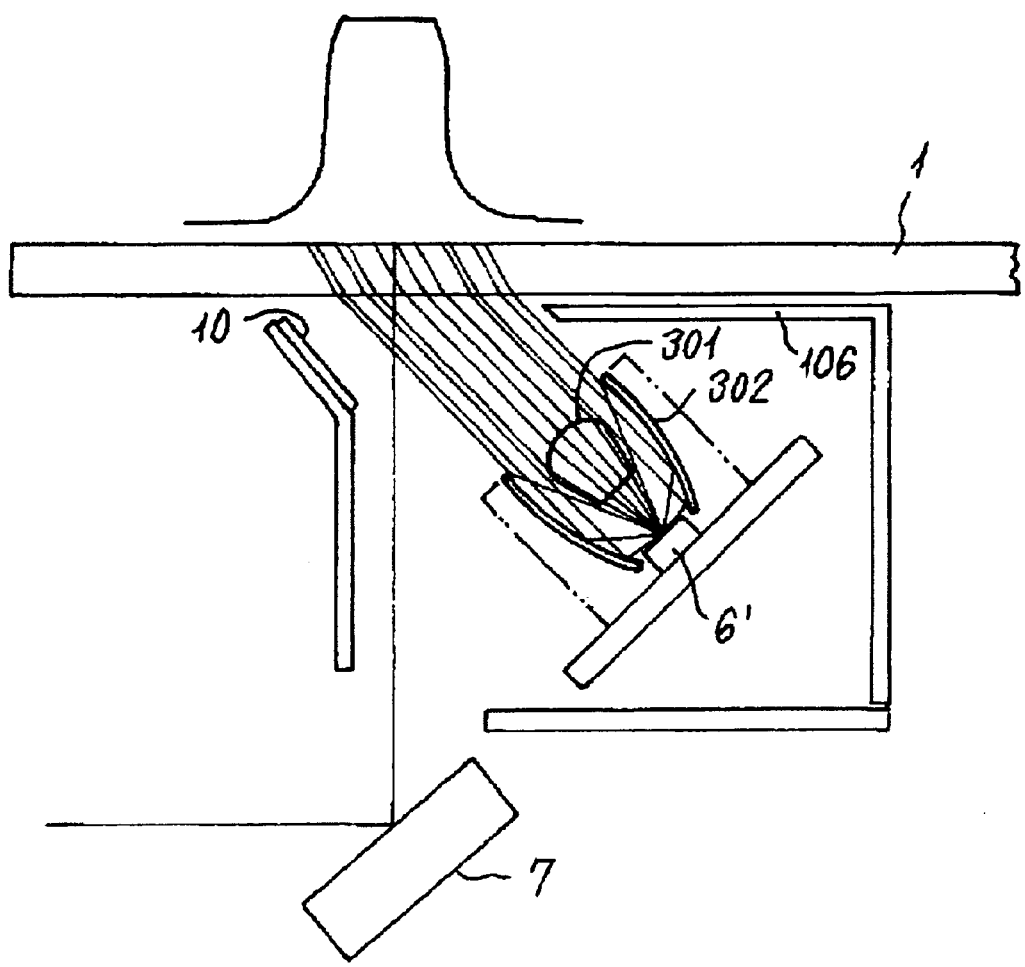
FIG. 15 is an illustration of still another embodiment.

FIG. 15 is a drawing that depicts still another embodiment of the present invention.

In this figure, reference numeral 301 represents a cylindrical lens serving as a light-guiding member, and 302 represents a reflection plate the cross section in the scanning direction of which forms a parabolic line.

In the embodiment shown in FIG. 13, light rays, released from the point light source 6' and reached the reflection face 105a, are sometimes reflected twice, and always made incident on the light-guiding member 101'. However, it is not possible to sufficiently control the releasing direction of these light rays when they are released from the light-guiding member 101'.

Therefore, in the present embodiment, the reflection face of the reflection plate 302 is formed as a cylindrical parabolic face mirror with its optical axis (symmetrical axis) being virtually directed to the center of the reading area, and this is placed so that the point light source 6' is made coincident with its focal point position in the cross section in the sub-scanning direction. With this arrangement, light rays, which have been released from the point light source 6' and have reached the reflection plate 302, are all allowed to proceed in parallel with the optical axis.

A cylindrical lens 301 has a plane face on its one face with the other face being formed into a convex curved face. Whichever face may be used as an incident surface for light rays, and in this figure, the flat face side is allowed to face the point light source 6'.

Light rays, which are released inward from the opening section of the reflection plate 302, are not allowed to reach the reflection plate, and the incident surface of the cylindrical lens 301 is arranged so that all the light rays at this area are made incident on the cylindrical lens 301. At this time, when the arrangement is made so that the light-emitting center of the point light source 6' is made coincident with the focal line position of the cylindrical lens 301 with the optical axis being made coincident with the optical axis of the reflection plate 302, all the light rays released from the cylindrical lens 301 are allowed to form light rays in parallel with the optical axis. Consequently, all the light rays released from the point light source 6' are formed into parallel light rays, and allowed to reach the document face. Here, the optical axis of the cylindrical lens, mentioned here, is supposed to be a straight line that passes through the center of curvature of the convex face, and is perpendicular to the plane face portion.

The gap between the cylindrical lens 301 and the reflection plate 302 needs to be opened since light rays pass through the gap. For this reason, the holding mechanism of the cylindrical lens 301 is placed on an end portion in the length direction (main-scanning direction).

As indicated by a hypothetical line in this figure, the reflection plate 302 may be prepared as a resin molded product having a parabolic face as its inner face, with the parabolic face being shaped into a mirror surface.

With this arrangement also, in order to shield unnecessary illumination light directed to the document face, a light-shielding member 106 may be placed right above the cylindrical lens 301, that is, between the cylindrical lens 301 and the contact glass 1. Moreover, an opposing reflection plate 10 may be placed at a position opposing to the light-emitting surface of the cylindrical lens 301 with the reading area located in between or beyond the reading area. With this arrangement, stray light, unnecessarily generated, is virtually returned to the reading area.

Figure 16:
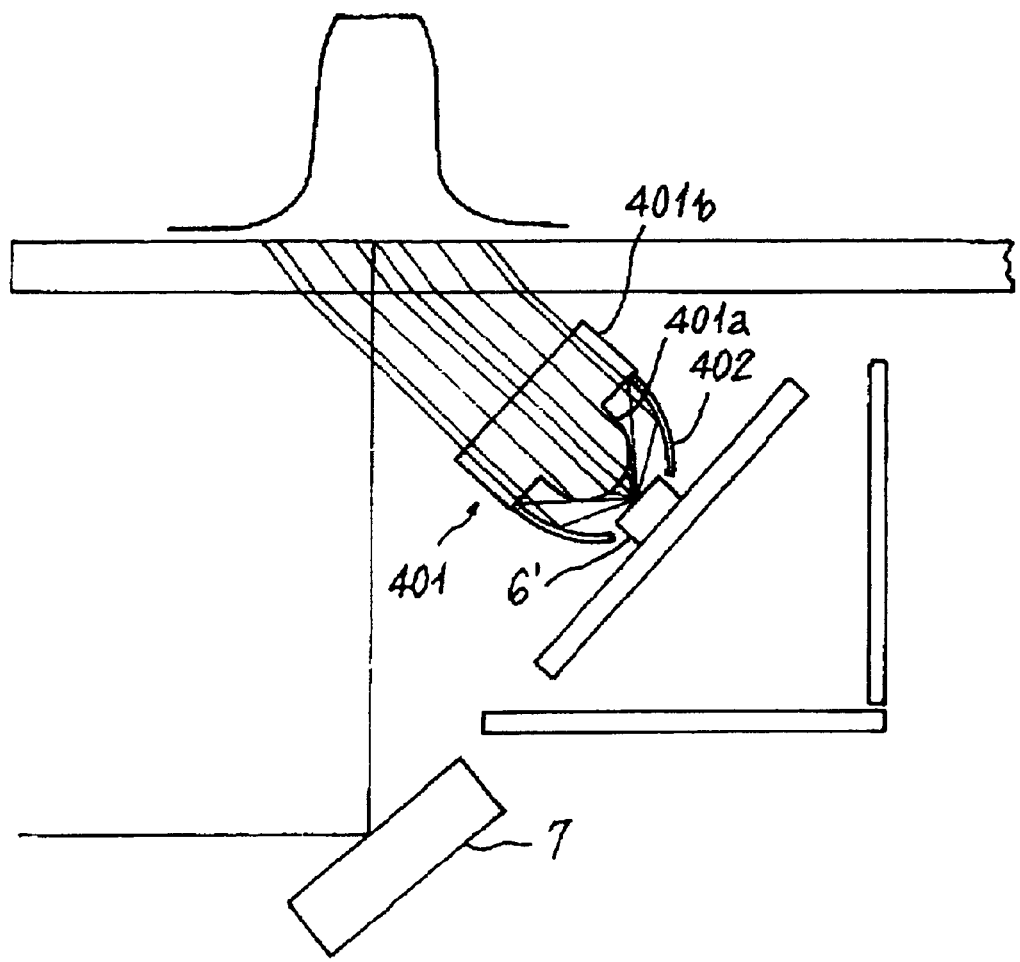
FIG. 16 is an illustration of still another embodiment.

FIG. 16 is a drawing that depicts still another embodiment of the present invention.

In this figure, reference numeral 401 represents a light-guiding member, and 402 represents a reflection plate the cross section in the sub-scanning direction of which forms a parabolic line.

The reflection plate 402 has the same structure and arrangement as that shown in the embodiment of FIG. 15.

In the present embodiment, the light-guiding member 401 has a composite structure in which a flat-plate portion 401b having two faces that are parallel flat faces is integrally joined to a convex-lens-based cylindrical lens portion 401a having its convex face on the point light source 6' side. In this case, the optical axis of the cylindrical lens in the cross section in the sub-scanning direction is defined as a straight line that passes through the center of curvature of the convex face, and is perpendicular to the parallel plane faces.

Here, the arrangement is made so that the light-emitting center of the point light source 6' is made coincident with the focal line of the cylindrical lens, with its optical axis being made coincident with the optical axis of the reflection plate 402. All the light rays, which are released inward from the opening section of the reflection plate 402, are made incident on the cylindrical lens portion 401a. Since, in the cross section in the sub-scanning direction, the point light source 6' is located at the lens focal point position, the released light rays are all formed into parallel light rays.

Light rays, released from the point light source 6' and reached the reflection plate 402, are reflected in parallel with the optical axis, and perpendicularly made incident on the flat-plate portion 401b of the light-guiding member 401. Therefore, the light rays are allowed to proceed straight, and further advance toward the document face after released from the flat-plate portion 401b, while being maintained in parallel with the optical axis.

Since the optical axis of the cylindrical lens is made coincident with the optical axis of the reflection plate 402, all the light rays, released from the point light source 6', are formed into parallel light rays in parallel with the optical axis, and allowed to proceed toward the document face.

Figure 17:
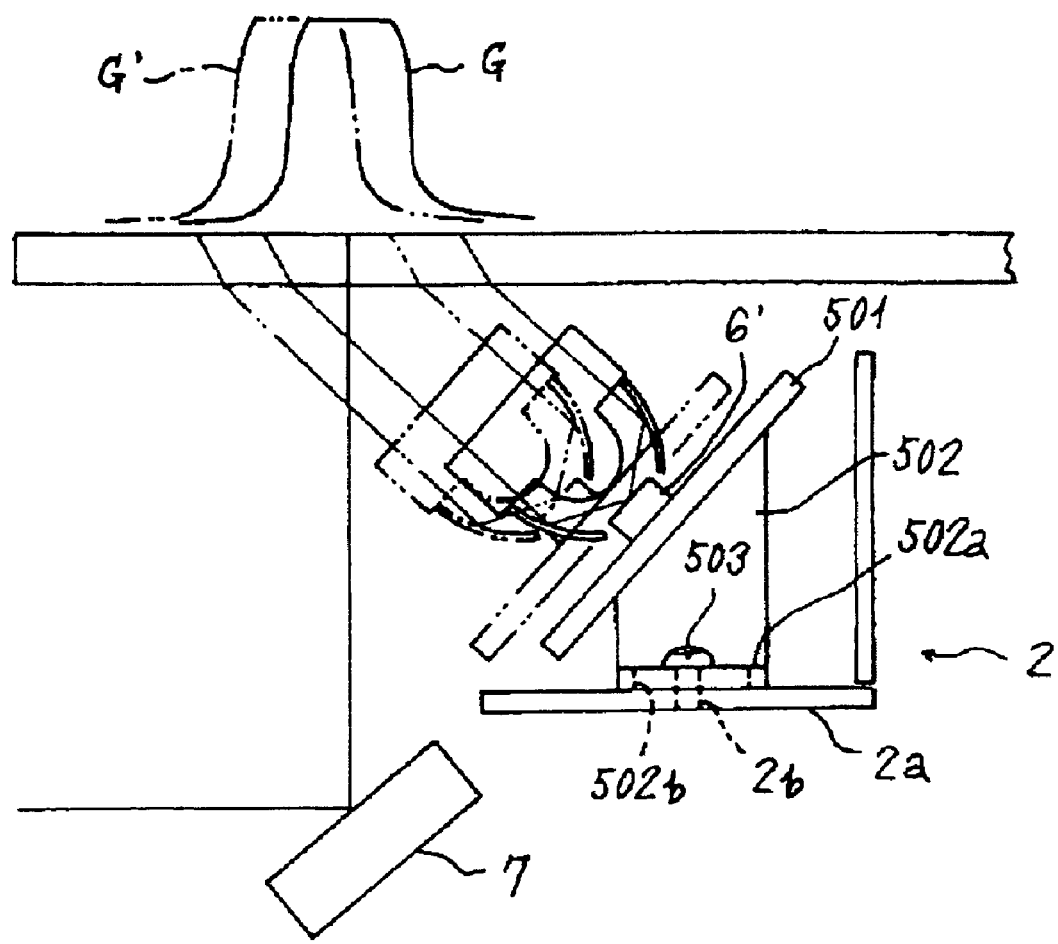
FIG. 17 is an illustration of still another embodiment.
Figure 18:
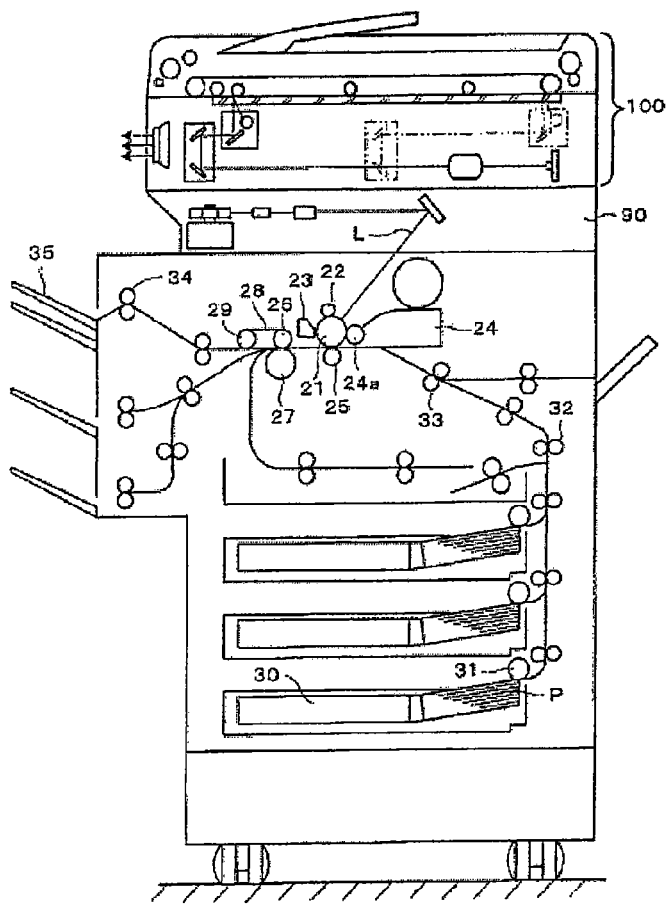
FIG. 18 is a drawing that depicts one example of an image forming apparatus having a document reading device.

FIG. 17 is a drawing that depicts still another embodiment of the present invention.

In this figure, reference numeral 501 represents a light-source substrate, and 502 represents a supporting substrate, respectively.

The point light source 6' is held on the light-source substrate 501 together with the light-guiding member, and the light-source substrate 501 is supported by the supporting substrate 502. The supporting substrate 502 is attached to a horizontal substrate 2a of the first carriage 2 through a screw hole 2b formed therein with a stop screw 503 by using an elongated hole 502b formed in its curved portion 502a, in a manner so as to be adjusted in the sub-scanning direction. For example, in the case when the illuminance distribution curve of illumination light has its center deviated from the center of the reading area as indicated by G' when first attached, the supporting substrate 502 is shifted in the sub-scanning direction with respect to the first carriage 2, with the stop screw 503 being loosened, so that, as indicated by an illuminance distribution curve G, the center of the high illuminance distribution range is made coincident with the center of the reading area. After the adjustment, the stop screw 503 is tightened so that the supporting substrate 502 is secured onto the first carriage 2.

According to the present invention, by using a light-source device having a simple structure in which a light-guiding member is installed right before an LED, it is possible to provide a illumination device that can illuminate mainly only the desired range.

According to the present invention, it is possible to provide the illumination device, the document reading device, the adjusting device, and the image forming device, in which only the desired area is illuminated. Accordingly, there is no need to be bothered with the difference between the illuminance obtained when the document is stationary and the illuminance obtained when the document is moved with respect to the device, in the scanner compatible with both of the fixed document reading scheme and the document transfer reading scheme.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An illumination device, which is used in a document-reading device configured to irradiate light over at least a predetermined illumination width including a reading area having a predetermined reading width extending in a main scanning direction of a document and to read the light reflected from the document using an image-reading element, the illumination device comprising:
    a point light source;
    a light-guiding member having an incident surface opposed to a light-emitting surface of the point light source and a light-emitting surface opposed to the reading area;
    a carriage configured to shift an illumination area in a sub-scanning direction; and
    a support base configured to support and hold the point light source and the light-guiding member together as a unit, and to be attached to the carriage adjustably in the sub-scanning direction,
    wherein an illumination area generated by the light irradiated from the point light source has a high illuminance distribution range of a substantially constant illuminance, and the high illuminance distribution range coincides substantially with the reading area.

2. The illumination device according to claim 1, comprising a plurality of point light sources that are arranged in the main scanning direction.

3. The illumination device according to claim 1, further comprising:
    a reflector configured to surround a region over which the light emitted from the point light source is irradiated between the point light source and the incident surface of the light-guiding member.

4. The illumination device according to claim 1, further comprising:
    a light-shielding member configured to shield a surface of the document located above the light-guiding member from the light emitted from the light-emitting surface of the light-guiding member.

5. The illumination device according to claim 1, further Comprising:
    an opposing reflector located at a position opposed to the light-emitting surface of the light-guiding member and beyond the reading area.

6. The illumination device according to claim 1, wherein a surface except for the light-emitting and incident surfaces of the light-guiding member is configured to reflect light.

7. The illumination device according to claim 1, further comprising:
    a plurality of the point light source that are arranged in the sub-scanning direction.

8. The illumination device according to claim 1, wherein the predetermined reading width corresponds to a width in the sub-scanning direction over which the image reading element receives the light.

9. The illumination device according to claim 1, wherein the predetermined illumination width is equivalent to a width corresponding to a variation due to a manufacture tolerance of parts of the illumination device added to a width corresponding to a width in the sub-scanning direction over which the image reading element receives the light.

10. A document reading device configured to irradiate light over at least a predetermined illumination width including a reading area having a predetermined reading width extending in a main scanning direction of a document and to read the light reflected from the document using an image-reading element, the document reading device comprising an illumination device comprising:
    the illumination device according to claim 1.

11. An image forming apparatus comprising a document reading device configured to irradiate light over at least a predetermined illumination width including a reading area having a predetermined reading width extending in a main scanning direction of a document and to read the light reflected from the document using an image-reading element, the document reading device comprising an illumination device comprising:

the illumination device according to claim 1.

12. An illumination device, which is used in a document-reading device configured to irradiate light over at least a predetermined illumination width including a reading area having a predetermined reading width extending in a main scanning direction of a document and to read the light reflected from the document using an image-reading element, the illumination device comprising:

a plurality of point light sources;

a point light source substrate including the plurality of point light sources aligned in the main scanning direction;

a light-guiding member having an incident surface opposed to a light-emitting surface of the point light source substrate and a light-emitting surface opposed to the reading area;

a carriage configured to shift an illumination area in a sub-scanning direction; and a support base configured to hold the point light source substrate and the light-guiding member, and to be attached to the carriage adjustably in the sub-scanning direction.

13. The illumination device according to claim 12, wherein the point light source substrate provided on the support base has an inclined surface.

14. The illumination device according to claim 12, wherein the support base is configured to be movably mounted in the sub-scanning direction on a horizontal substrate of the carriage.

15. The illumination device according to claim 14, wherein the support base and the horizontal substrate of the carriage are fixed with a stopping member.

16. A document reading device configured to irradiate light over at least a predetermined illumination width including a reading area having a predetermined reading width extending in a main scanning direction of a document and to read the light reflected from the document using an image-reading element, the document reading device comprising:

the illumination device according to claim 12.

17. An image forming apparatus comprising a document reading device configured to irradiate light over at least a predetermined illumination width including a reading area having a predetermined reading width extending in a main scanning direction of a document and to read the light reflected from the document using an image- reading element, the document reading device comprising:

the illumination device according to claim 12.

18. An illumination device, which is used in a document-reading device configured to irradiate light over at least a predetermined illumination width including a reading area having a predetermined reading width extending in a main scanning direction of a document and to read the light reflected from the document using an image- reading element, the illumination device comprising:

a point light source;

a light-guiding member having an incident surface opposed to a light-emitting surface of the point light source and a light-emitting surface opposed to the reading area;

a carriage configured to shift an illumination area in a sub-scanning direction; and a support base configured to support and hold the point light source and the light-guiding member together as a unit, and to be attached to the carriage adjustably in the sub-scanning direction.

19. A document reading device configured to irradiate light over at least a predetermined illumination width including a reading area having a predetermined reading width extending in a main scanning direction of a document and to read the light reflected from the document using an image-reading element, the document reading device comprising:

the illumination device according to claim 18.

20. An image forming apparatus comprising a document reading device configured to irradiate light over at least a predetermined illumination width including a reading area having a predetermined reading width extending in a main scanning direction of a document and to read the light reflected from the document using an image- reading element, the document reading device comprising:

the illumination device according to claim 18.

* * * * *